United States Patent [19]
Bolton et al.

[11] Patent Number: 5,669,843
[45] Date of Patent: Sep. 23, 1997

[54] ACTUATOR

[75] Inventors: Brian Lewis Bolton, Kirksville, Mo.; Yoshio Yuyama, Hiroshima, Japan; Katsutoshi Akutagawa, Aki-gun, Japan; Hiromi Matsuura, Higashihiroshima, Japan

[73] Assignee: U-Shin Ltd., Tokyo, Japan

[21] Appl. No.: 629,499

[22] Filed: Apr. 10, 1996

[30]  Foreign Application Priority Data

| Apr. 21, 1995 | [JP] | Japan | 7-096970 |
| Apr. 28, 1995 | [JP] | Japan | 7-106191 |
| Apr. 28, 1995 | [JP] | Japan | 7-106215 |
| May 24, 1995 | [JP] | Japan | 7-124948 |
| May 24, 1995 | [JP] | Japan | 7-124950 |
| May 24, 1995 | [JP] | Japan | 7-124958 |
| May 24, 1995 | [JP] | Japan | 7-124974 |

[51] Int. Cl.$^6$ ............................................. F16H 35/00
[52] U.S. Cl. .......................... 475/149; 475/338; 475/343
[58] Field of Search ............................. 475/149, 331, 475/342, 343, 335, 338, 339, 901, 902; 292/336.3, 201

[56]  References Cited

U.S. PATENT DOCUMENTS

| 3,774,477 | 11/1973 | Murphy | 475/338 X |
| 4,518,182 | 5/1985 | Cousin et al. | 292/201 |
| 4,520,914 | 6/1985 | Kagiyama et al. | 192/71 |
| 4,727,301 | 2/1988 | Fulks et al. | 318/468 |
| 4,904,006 | 2/1990 | Hayakawa et al. | 292/336.3 |
| 4,921,288 | 5/1990 | Cifuentes et al. | 292/144 |
| 5,221,239 | 6/1993 | Catlett | 475/342 |
| 5,500,564 | 3/1996 | Sano et al. | 310/83 |

Primary Examiner—Charles A. Marmor
Assistant Examiner—Peter T. Kwon
Attorney, Agent, or Firm—Wenderoth, Lind & Ponack

[57]  ABSTRACT

An actuator comprises a housing member including a motor compartment and a gear compartment, the gear compartment having inner teeth formed on the inner periphery thereof, a motor having a rotary shaft with a motor gear mounted thereon, the motor being housed in the motor compartment in such a way as to permit the motor gear to project into the gear compartment, an output shaft projecting outwardly from the housing member, a larger diameter gear housed in the gear compartment which is rotatable about the output shaft and held in mesh engagement with the motor gear, a smaller diameter gear disposed coaxially with the larger diameter gear and rotatable in conjunction with the rotation of the larger diameter gear, a planet gear held in mesh engagement with both the smaller diameter gear and the inner teeth formed in the gear compartment so that the planet gear can shift its engagement position with respect to the inner teeth as the smaller diameter gear rotates, and a rotary member engaging the planet gear for rotation within the gear compartment, the output shaft being rotatable in response to the rotation of the rotary member.

13 Claims, 9 Drawing Sheets

ACTUATOR

BACKGROUND OF THE INVENTION

1. Field of the Invention

The present invention relates to an actuator for use in automotive door lock mechanism or the like.

2. Description of the Prior Art

Figure 13A:
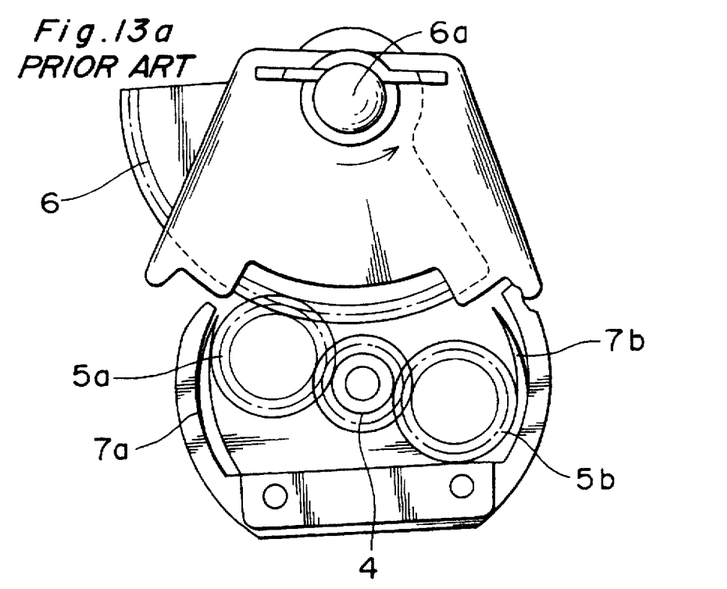
FIG. 13a and 13b are, respectively, a plan view and a sectional view of a prior art actuator.
Figure 13B:
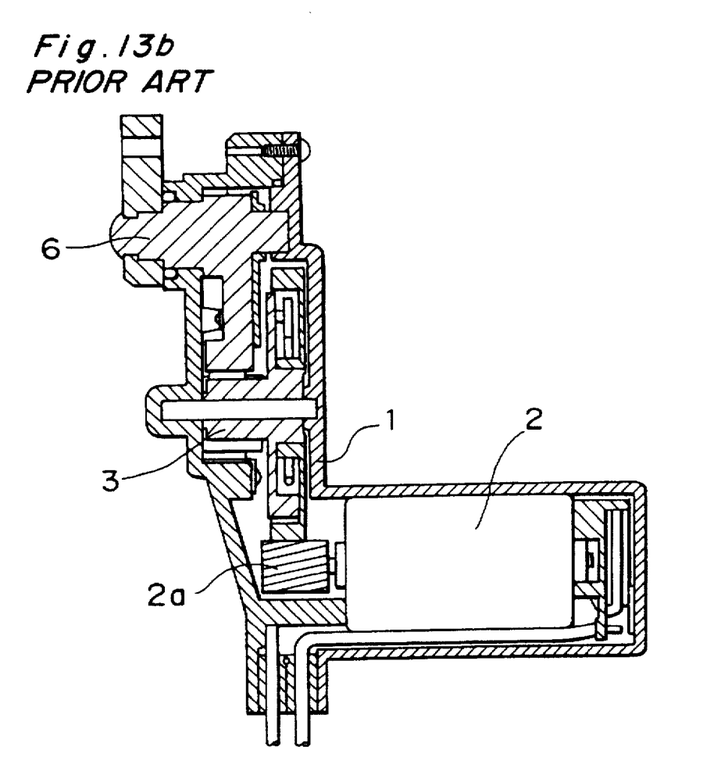

Hitherto, there has been known an actuator for use in automotive door lock mechanism as illustrated in FIGS. 13a, 13b annexed hereto (see Japanese Patent Application Laid-Open No. 2-256776).

This actuator includes a holder 1, and housed within the holder 1, a reversely drivable motor 2, a larger diameter gear 3 driven by the motor 2 for rotation in mesh engagement with a motor gear 2a provided on a rotary shaft of the motor 2, a smaller diameter gear 4 integrally rotatable with the larger diameter gear, a pair of idler gears 5a, 5b mesh-engageable with the smaller diameter gear 4, and a follower gear 6 rotatable about a shaft portion 6a in mesh engagement with one idler gear 5a of the pair for actuating a door lock mechanism (not shown). Designated by 7a, 7b are arm portions.

According to such actuator arrangement, when the motor 2 is driven, the larger-diameter and smaller-diameter gears 3 and 4 go into rotation through the motor gear 2a and, in turn, the idler gears 5a, 5b shift in position as they respectively abut against the arm portions 7a, 7b while in rotation. The one idler gear 5a goes into mesh engagement with the follower gear 6, whereupon the follower gear 6 goes into rotation about the shaft portion 6a to actuate the door lock mechanism.

However, since the prior art actuator is such that the idler gears 5a, 5b make a shift in position while they are held in abutment against the arm portions 7a, 7b, considerable resistance is involved and this makes it impracticable to expect any smooth operation with the actuator. In addition, because of the fact that the follower gear 6 is positioned in substantially same plane as the idler gears 5a, 5b and that the motor 2 projects in a direction orthogonal to these elements, the actuator involves considerable space and weight, with an added disadvantage of unfavorable weight balance.

Another drawback of the prior art actuator is that vibrations at the motor 2 are likely to be transmitted to the holder 1 or the like which in turn creates noise as it comes in contact with some other elements, such noise, as well as noise generated by the motor 2 per se, being possibly a source of discomfort.

In order to stop such vibrations and noise from the motor 2, it maybe conceivable, for example, to attach a highly vibration- and noise-absorptive rubber material to sides of the motor 2. However, this involves labor for rubber attachment and an increase in the number of parts, which is a problem from the standpoints of working efficiency and cost economy.

With the foregoing prior art actuator, it is necessary that the motor be first driven to rotate the larger and smaller diameter gears to cause the idler gears to be shifted as they are held in abutment against the arm portions. Therefore, such factors as dimensional and assembly tolerances with respect to component parts, coupled with possible deterioration due to use, may hinder smooth transmission of driving force of the motor.

Further, in the prior art actuator, the larger diameter gear 3 and the smaller diameter gear 4 are of integral construction. This, coupled with the fact that these gears are fabricated by sintering, necessitates the use of a very complex and costly die in the fabrication of the gears. Additionally, the complicated construction of the gears makes it very difficult to finish the gears to the required dimensional tolerance, especially in respect of height.

SUMMARY OF THE INVENTION

The present invention substantially eliminates the above-described disadvantages.

It is an object of the present invention to provide an actuator which is small-sized and lightweight and is capable of transmitting the driving force of the motor to the output shaft in a smooth and well-balanced manner.

It is another object of the invention to inhibit propagation of vibrations and noise from the motor without involving any increase in the number of component parts.

It is another object of the invention to provide an actuator such that gears accommodated therein are simple in construction.

It is still another object of the invention to provide an actuator of such arrangement as will not interfere with manual operation of the door lock mechanism employed.

The actuator of the present invention comprises: a housing member including a motor compartment and a gear compartment, the gear compartment having inner teeth formed on the inner periphery thereof; a motor having a rotary shaft with a motor gear mounted thereon, the motor being housed in the motor compartment in such a way as to permit the motor gear to project into the gear compartment; an output shaft projecting outwardly from the housing member; a larger diameter gear housed in the gear compartment which is rotatable about the output shaft and held in mesh engagement with the motor gear; a smaller diameter gear disposed coaxially with the larger diameter gear and rotatable in conjunction with the rotation of the larger diameter gear; a planet gear held in mesh engagement with both the smaller diameter gear and the inner teeth formed in the gear compartment so that the planet gear can shift its engagement position with respect to the inner teeth as the smaller diameter gear rotates; and a rotary member engaging the planet gear for rotation within the gear compartment, the output shaft being rotatable in response to the rotation of the rotary member.

According to this actuator arrangement, when the motor is driven, the rotational force of the motor gear is transmitted to the larger diameter gear and, in turn, the smaller diameter gear goes into rotation. The rotation of the smaller diameter gear is transmitted to the planet gear which, in turn, rotates around the smaller diameter gear while shifting its engagement position with respect to the inner teeth of the housing member. As a result, rotational force is transmitted to the output shaft through a rotary table.

According to the arrangement, it is possible to provide an actuator in a very compact form as compared with the prior art in which the follower gear and the idler gear set are disposed in one plane. The inner teeth of the housing member serve concurrently as a ring gear, which results in weight reduction. Further, the fact that the driving force of the motor is entirely transmitted to the output shaft through gears provides for smooth operation.

Preferably, the motor gear and the larger diameter gear are in the form of bevel gears, and the larger diameter and smaller diameter gears are arranged to be rotatable about the output shaft, the output shaft being disposed in orthogonal relation to the rotary shaft of the motor.

According to this arrangement, it is possible to provide an actuator in a more compact form, with its thickness limited to a moderate extent.

Preferably, the rotary member has a spring groove formed in arcuate shape therein and is responsive to the rotation of the gears, the rotary member further including a coil spring housed in the spring groove, and guide portions disposed across the coil spring for biasing the rotary member toward a neutral position.

When the motor is driven, the rotary member rotates through the gears and in turn the output shaft rotates. When the motor is stopped, the rotary member returns to the neutral position under the biasing force of the coil spring.

This arrangement permits smooth operation of the rotary member and insures the return of the rotary member to the neutral position.

The spring groove of the rotary member may be defined by spring guide portions erected at predetermined intervals, and the spring guide portion located at the outer side may be provided with an inwardly extending slip-off preventive portion for preventing the slipping off of the coil spring.

According to this arrangement, during the rotation of the rotary member, the coil spring is guided by the slip-off preventive portion so that it is prevented from shaking and/or from slipping out from the spring groove. This insures smooth rotation of the rotary member.

Preferably, a predetermined play is provided between the rotary member and the output shaft.

In this conjunction, there may be provided an action knob which is rotatable with a certain angle of play relative to the rotation of the rotary member, the output shaft being rotatable integrally with the action knob.

According to this arrangement, when the motor is stopped, the rotary member is constantly allowed to return to the neutral position under the biasing force of the coil spring. Further, since no element other than the action knob will work even if operation is attempted from the output shaft side, the output shaft side of the rotary member may be connected to, for example, an inner lock knob of an automobile.

Preferably, the gear compartment is formed at its bottom with a plurality of recesses, with balls placed in the recesses for rotatably supporting the larger diameter gear.

According to this arrangement, when the motor is driven, the larger diameter gear is rotated through the motor gear. The larger diameter gear is rotatably supported through point contact by balls at plural locations in the gear compartment of the housing member. Therefore, the larger diameter gear, held in good mesh engagement with the motor gear, is allowed to rotate smoothly to transmit power to the output shaft through other gears.

Preferably, the larger diameter gear has in its center portion an engagement hole formed with engaging inner teeth, while the smaller diameter gear has at one end thereof a small diameter portion which is smaller in outer diameter, the small diameter portion being non-rotatably engageable with the engagement hole of the larger diameter gear.

Preferably, the housing member is in the form of a combination of two components and includes a seal member for sealing a junction of the housing member, the seal member having a motor keep element provided integrally therewith for absorbing vibrations and noise from the motor through direct contact with the motor.

According to this arrangement, when combining the two components into the housing member, the motor and other items are housed within the housing member and the seal member is fitted in the junction, whereby the seal member keeps the interior of the housing member in sealed condition and causes the motor keep portion to be brought into direct contact with the motor. When the motor is driven, vibrations and noise from the motor are absorbed by the motor keep portion and thus prevented from becoming leaked outward.

Preferably, the driving force of the motor is arranged to be transmitted from a plurality of gears to the output shaft through the rotary member, and the seal member is provided with an inwardly extending cushioning portion for regulating the rotational angle range of the rotary member through contact therewith.

According to this arrangement, when the motor is driven to actuate the rotary member into rotation, the cushioning portion goes into abutment with a portion of the rotary member to regulate the rotation angle range for the rotary member. Since the cushioning portion is constructed from a portion of the sealing member, the cushioning portion acts to alleviate and absorb any impact from the impingement of the rotary member thereupon.

Preferably, the housing member has an air vent hole bored therein which is open in a horizontal direction, and the seal member has a water exposure preventive portion formed therein which covers a vertically lower portion of the air vent hole.

According to this arrangement, even if there occurs expansion or contraction of interior air due to heat generation or the like with internal components, the internal pressure can be adjusted through the air vent hole. Since the water exposure preventive portion is located in a lower portion of the air vent hole, water droplets which may have entered through the air vent hole are prevented from any further inward entry.

Preferably, the air vent hole comprises an inner side recess oriented horizontally from the interior of the housing member, and an outer side recess oriented horizontally from the outer side of the housing member, the interior portions defining the respective recesses being in direct communication with each other.

When forming the housing member by injection molding, the air vent hole can be simultaneously formed merely by using a simple cutting die arrangement. Since the inner side recess communicates with the outer side recess at a vertically upper side location thereof, none or little of any water droplets which may have entered through the air vent hole could reach the inner side recess.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Figure 1:
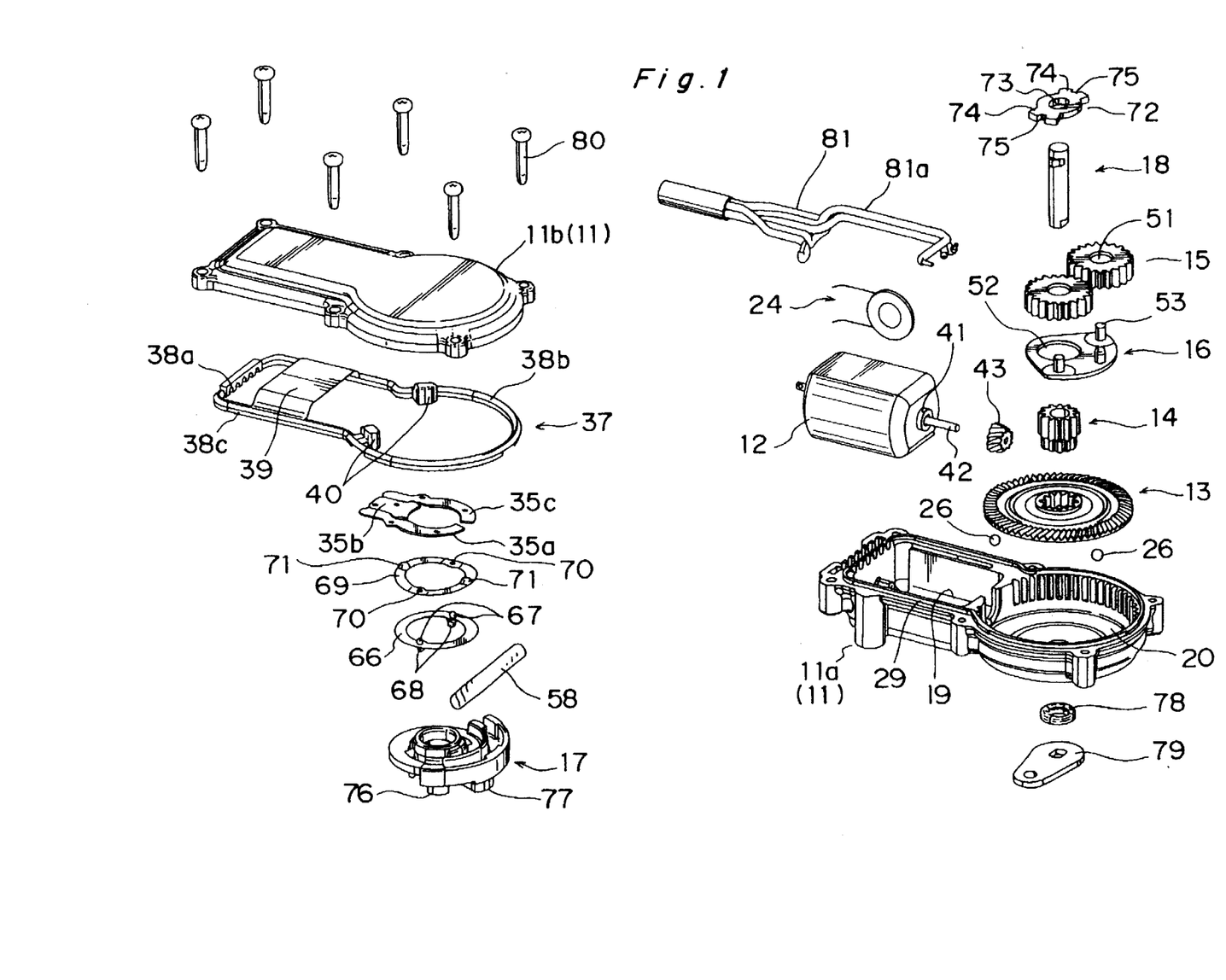
FIG. 1 is a exploded perspective view of an actuator embodying the present invention.

FIG. 1 shows an exploded perspective view of an actuator 10 representing one embodiment of the present invention. This actuator 10 includes a holder 11 which serves as a housing member, and housed therein a motor 12, a larger diameter gear 13, a smaller diameter gear 14, a planet gear 15, 15, and rotary members, such as a mounting base 16, a rotary table 17, and an action knob 72, with an output shaft 18 projected outward.

The holder 11 consists of a pair of synthetic resin made holders 11a, 11b, lower and upper, fabricated by injection molding.

Figure 2:
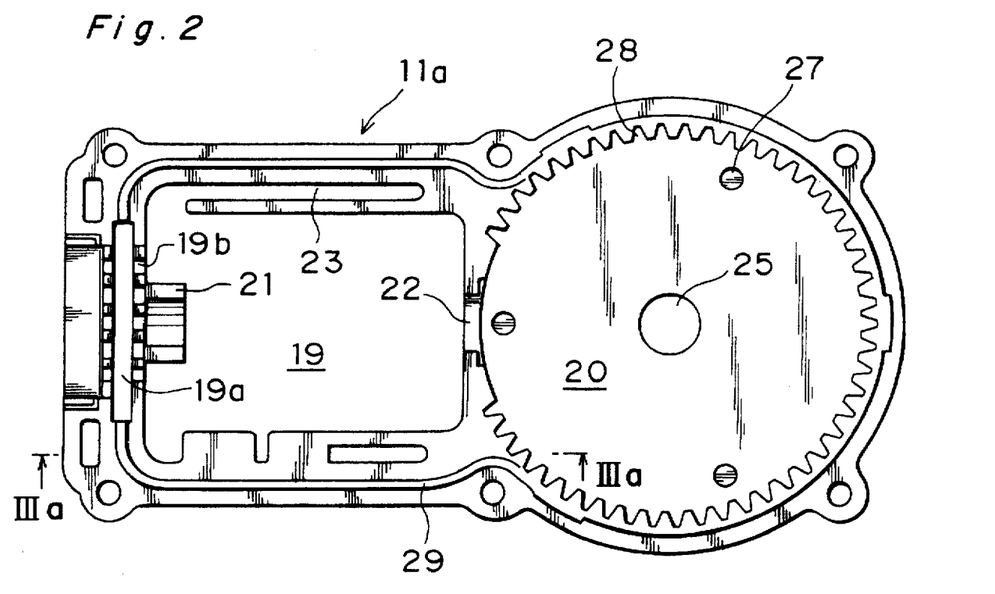
FIG. 2 is a plan view of a first holder shown in FIG. 1.
Figure 3A:
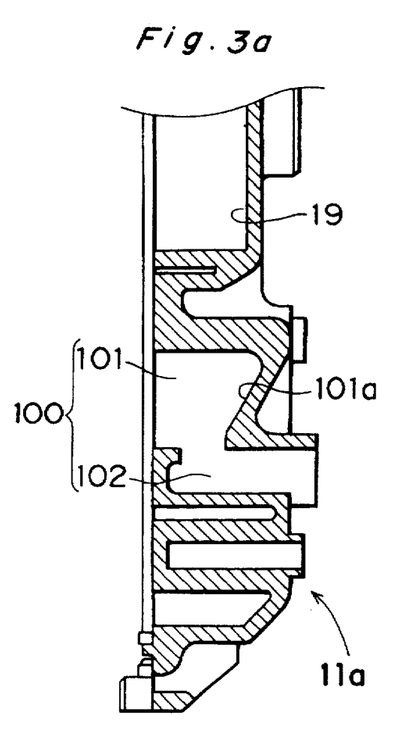
FIGS. 3a and 3b are, respectively, a section taken on line IIIA—IIIA before a seal member is mounted to the first holder in FIG. 2, and a section taken on the same line after the seal member is mounted in position.
Figure 3B:
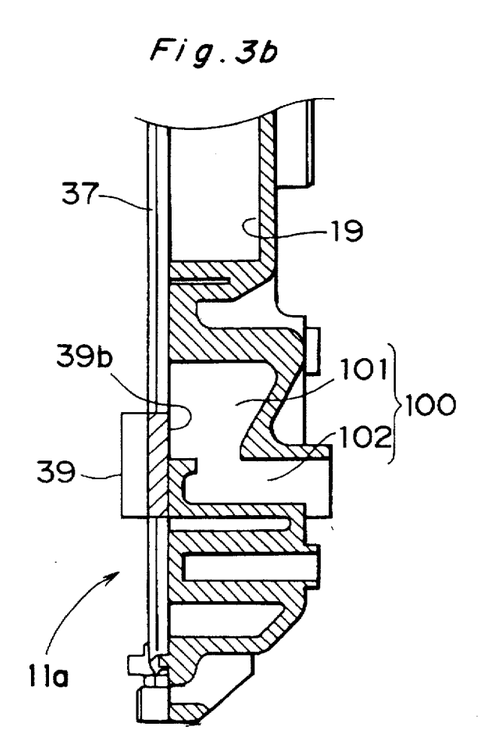

The lower holder or first holder 11a includes a motor compartment 19 and a gear compartment 20, as shown in FIG. 2. One end wall of the motor compartment 19 is formed at upper edge thereof with a plurality of harness fitting receptacles 19b, with a recess 19a centrally formed thereon. At a lower side of the one end wall there is disposed a holding base 21. The other end wall of the motor compartment 19 is formed with a notched portion 22 which allows the motor compartment 19 and the gear compartment 20 to communicate with each other. Formed on one side wall of the motor compartment 19 is a slit portion 23 adapted for placement of a positive thermistor 24 (see FIG. 1) therein. The positive thermistor 24 is to prevent the motor 12 from heat generation such that it restricts current supply to the motor 12 in response to heat generation in the positive thermistor 24 itself due to excess current and/or heat generation in the motor 12. The other side wall of the motor compartment 19 is formed with an air vent hole 100. The air vent hole 100, as may be seen from FIGS. 3a, 3b, includes an interior side recess 101 formed on the interior side of the first holder 11a and an exterior side recess 102 formed on the exterior side which are made to communicate with each other. The recesses 101, 102 are formed straight without involving any undercut portion relative to the direction of die removal in the stage of injection molding. Therefore, any complicated die component, such as slide core, is not required in the process of molding. The bottom of the interior side recess 101 has an inclined surface 101a formed in such a way that when, as will be described hereinafter, the actuator 10 is employed in a door lock mechanism 90, being mounted to a door body so that the motor compartment 19 side of the actuator 10 is positioned vertically lower, the vertically upper side of the recess is deeper. Thus, water droplets which have entered into the interior side recess 101 are smoothly discharged through the exterior side recess 102, without being retained inside. Of course, the air vent hole 100 may be provided in the upper holder or second holder 11b and not in the first holder 11a.

A through-hole 25 is bored centrally in the bottom of the gear compartment 20, with recesses 27 formed at three circumferential locations around the through-hole 25 for receiving steel balls 26 (see FIG. 1). The inner periphery of the side wall is formed with inner teeth 28. Each of the steel balls 26, as it is placed in recess 27, protrudes slightly from the bottom of the gear compartment 20 and comes in point contact with the larger diameter gear 13 accommodated within the gear compartment 20 as will be described hereinafter. Thus, slide resistance during the rotation of the larger diameter gear 13 is restrained and the possibility of any superfluous load being applied on the output shaft 18 is eliminated. This permits smooth rotation. Smooth mesh engagement can be had between the larger diameter gear 13 and a motor gear 43 to be hereinafter described.

Figure 12:
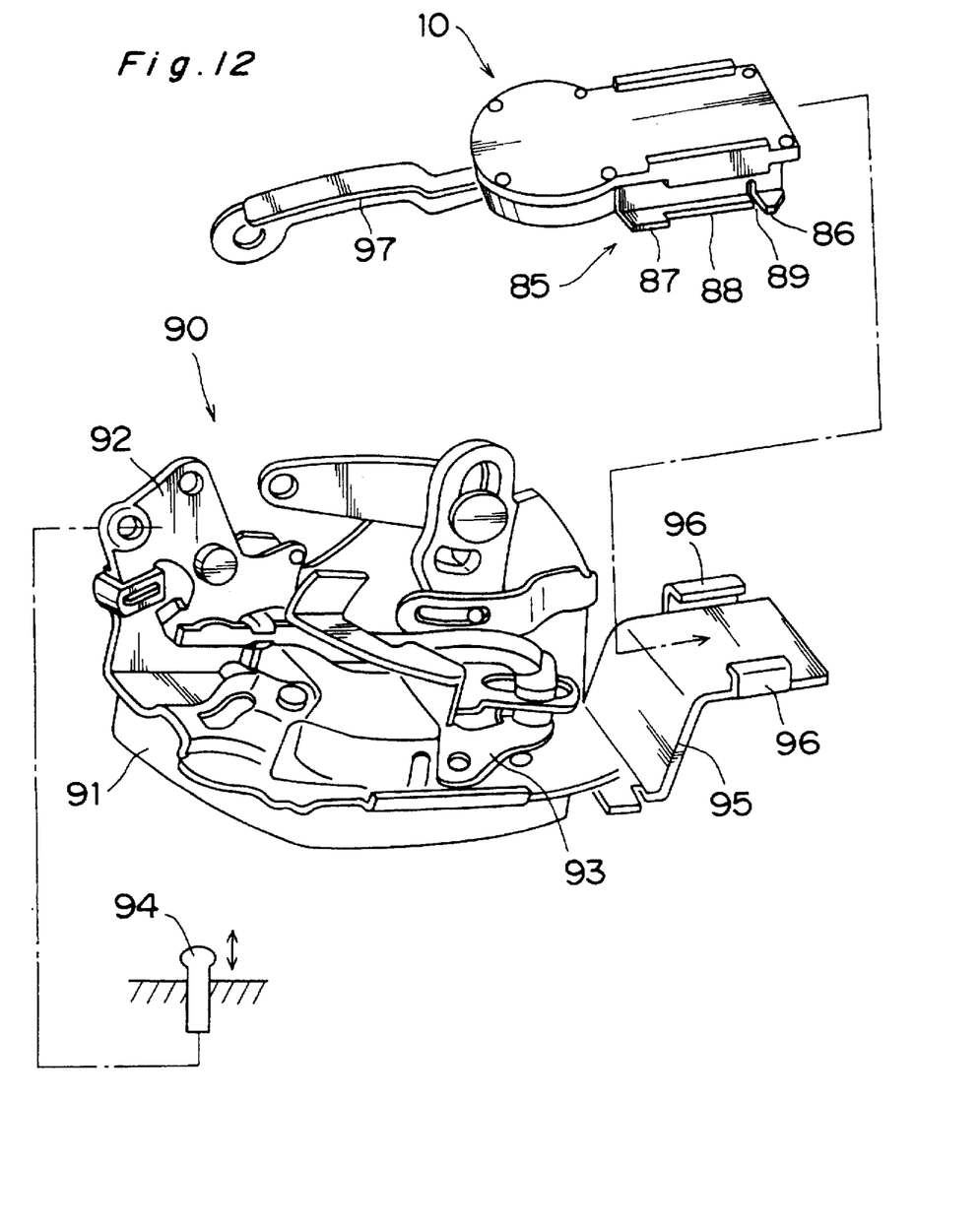
FIG. 12 is a perspective view showing one example of a door lock mechanism to which the actuator of the present invention is applicable.

The first holder 11a is formed with a ledge 29 extending along an outer edge thereof. The first holder 11a may have laterally extending locking pawl portions 85 formed on opposite side walls thereof at lower ends, as shown in FIG. 12. Each of the locking pawl portions 85 consists of a pair of locking pawls 86, 87, and a holding recess 88 formed between the two locking pawls 86, 87. The one locking pawl 86 is formed at its inner side base with a slit 89, whereby the locking pawl 86 is resiliently deformable in the inward direction.

Figure 4:
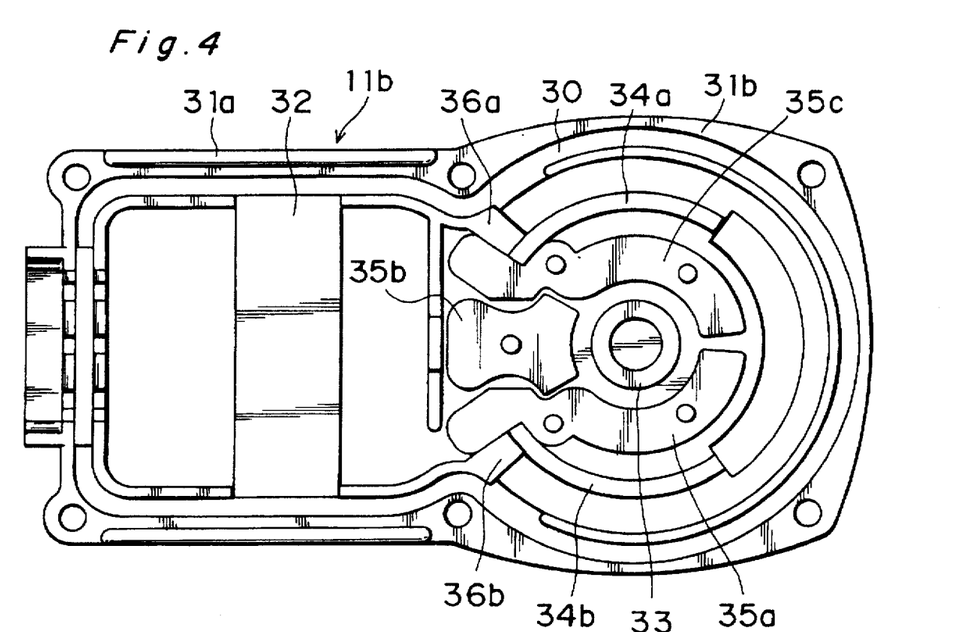
FIG. 4 is a plan view of the second holder shown in FIG. 1.

The second holder 11b, as FIG. 4 shows, has a generally planar shape adapted for covering the open top portion of the first holder 11a and is formed with a grooved portion 30 extending along an outer edge thereof in corresponding relation to the ledge 29 of the first holder 11a. A rectangular portion 31a which covers the motor compartment 19 is formed with a recess 32 for enabling opposite sides of the grooved portion 30 to communicate with each other at a center location. A circular portion 31b which covers the gear compartment 20 is formed at the center thereof with a tubular shaft portion 33 and, at locations inward of the grooved portion 30, with arcuate guide portions 34a, 34b symmetrical relative to a longitudinal center line passing through the shaft portion 33. Three terminal elements 35a, 35b, 35c are securely fixed in position around the tubular shaft portion 33, and stopper portions 36a, 36b are provided at one end of the guide portion (adjacent the rectangular portion 31a).

Figure 5A:
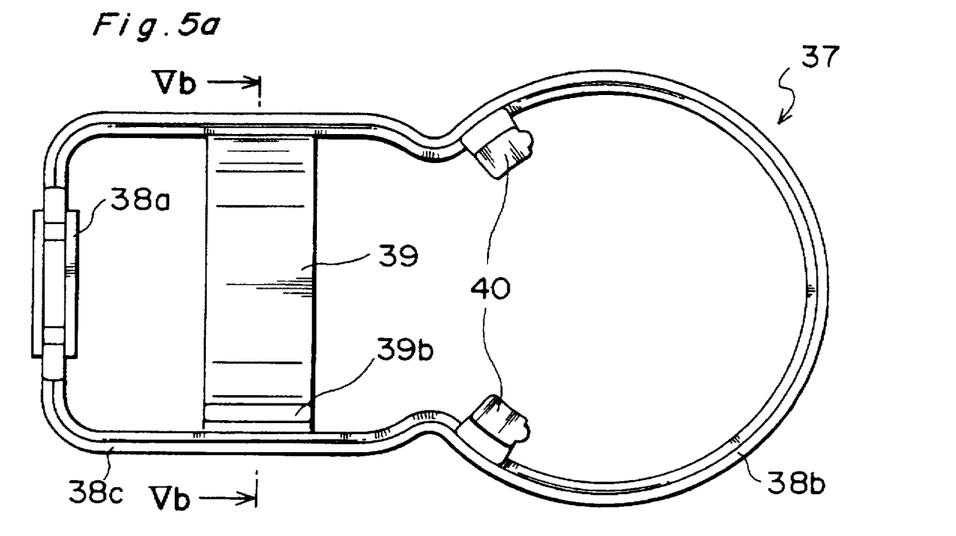
FIGS. 5a and 5b are, respectively, a plan view of the seal member shown in FIG. 1, and a view taken on line VB—VB.
Figure 5B:
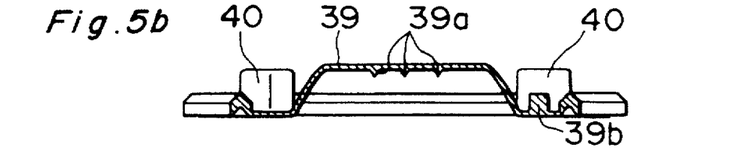
Figure 6:
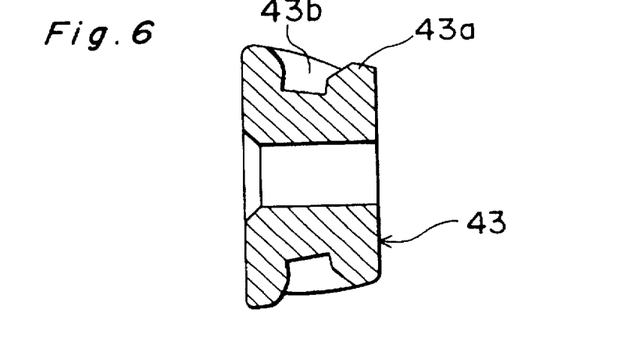
FIG. 6 is a sectional view of the motor gear shown in FIG. 1.

The grooved portion 30 and recess 32 are adapted to be integrally engaged by a seal member 37 as shown in FIGS. 5a, 5b. The seal member 37 comprises an outer edge seal portion 38 engageable with the grooved portion 30 and a motor hold-down portion 39 engageable with the recess 32. The outer edge seal portion 38 is formed at one end side thereof with a harness hold-down portion 38a adapted to be located within the recess 19a of the first holder 11a. An arcuate portion 38b of the outer edge seal portion 38 is provided at locations adjacent a straight portion 38c with inwardly extending cushioning portions 40. Each cushioning portion 40 is bulged circumferentially of the arcuate portion 38b in a ridge-like fashion, the bulge serving to alleviate an impact applied when the rotary table 17 rotates to cause a spring bearing 61 thereof to abut against the cushioning portion 40. The outer edge seal portion 38 is generally V-shaped in section such that it protrudes at its center portion in one direction (on the grooved portion 30 side). The motor hold-down portion 39 serves to absorb noise and vibrations from the motor 12 through its direct abutment against the motor 12. The motor hold-down portion 39 is formed at its hold-down surface side with tree protrusions 39a whereby the motor 12 can be surely held in position. The motor hold-down portion 39 also includes a water exposure preventive portion 39b protruding from the hold-down surface at one end thereof. This water exposure preventive portion 39b covers a portion of the interior side recess 101 when the seal member 37 is mounted to the first holder 11a. More specifically, the portion 39b covers a vertically lower side portion of the actuator 10 when in use.

The motor 12, as FIG. 1 shows, includes bearing portions 41 (only one side portion is shown) and a forwardly projecting rotary shaft 42 supported thereon, with a motor gear 43 to be mounted on the rotary shaft 42. A spiral toothed bevel gear, for example, may be used for the motor gear 43 and may be made of stainless steel (SUS 304). This is intended to improve the durability of the motor gear 43 by fabricating it from metal material because motor gear 43 is fixedly mounted by press fitting on a relatively thin rotary shaft 42 of the motor 12. The motor 12, with motor gear 43 fitted on its rotary shaft 42, is accommodated within the motor compartment 19 of the first holder 11a. The motor 12, housed in the motor compartment 19 of the first holder 11a, is supported at opposite bearing portions 41 by the holding base 21 and notched portion 22. In this condition, the motor gear 43 is positioned on the gear compartment 20 side.

Figure 7:
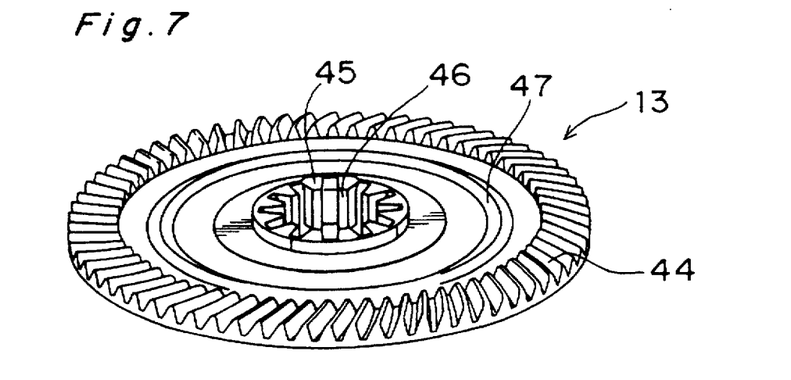
FIG. 7 is an enlarged perspective view of the larger diameter gear shown in FIG. 1.

The larger diameter gear 13 is constructed of, for example, synthetic resin (such as "Duracon") and comprises a spiral bevel gear similar to the one used for the motor gear 43. The outer circumferential edge portion of the bevel gear defines a spiral toothed portion 44 which engages the motor gear 43 on the rotary shaft 42 of the motor 12 to form a reduction gear mechanism. The larger diameter gear 13 has a slightly raised center portion which is formed centrally with an engagement hole 46 having engagement inner teeth 45. In a flat portion between the spiral toothed portion 44 and the engagement hole 46 there is formed an annular ledge portion 47 in a slightly raised fashion. The ledge portion 47 is intended to minimize the area of contact with the mounting base 16 to provide for smooth rotation.

Figure 8:
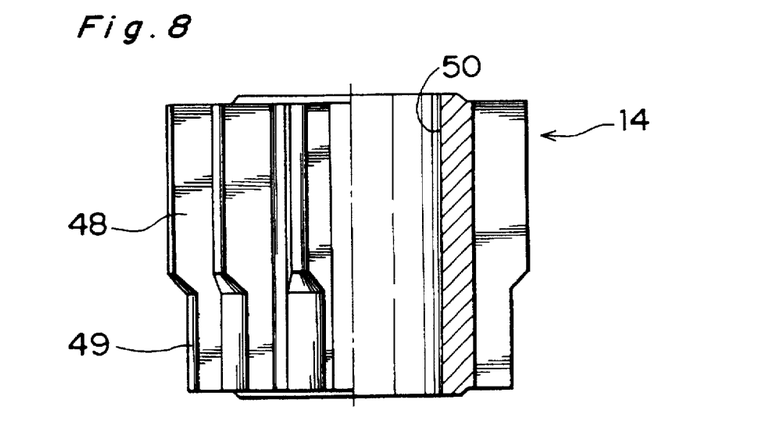
FIG. 8 is a front view partially in section of the smaller diameter gear shown in FIG. 1.

For the smaller diameter gear 14, as FIG. 8 shows, may be employed a spur gear fabricated by sintering. The smaller diameter gear 14 has a through-hole 50 bored centrally therein, and individual teeth 48 of the gear have, on the lower side thereof, a small diameter portion 49 which is smaller in outer diameter. The smaller diameter gear 14 has its small diameter portion 49 press fitted through the engagement hole 46 of the larger diameter gear 13 so as to be free from looseness, with individual teeth 48 held in mesh engagement with the engagement inner teeth 45, whereby the smaller diameter gear 14 is allowed to rotate integrally with the larger diameter gear 13. That is, simply by causing the small diameter portion 49 of the smaller diameter gear 14 to engage the engagement inner teeth 45 of the larger diameter gear 13, the smaller diameter gear 14 can easily be stopped from rotating in association with the larger diameter gear 13. Also, simply by limiting the formation range of the small diameter portion 49, the height of the smaller diameter gear 14, as integrally combined with the larger diameter gear 13, can be easily set to any desired value. Further, necessary die for the formation of smaller diameter gear 14 is simple in construction, and any such difficult job with sintered material as post-working is not required. Thus, the cost of fabrication can be well reduced.

Each planet gear 15 is formed from synthetic resin and, as FIG. 1 shows, two planet gears 15, 15 comprises a pair of spur gears mounted on the mounting base 16. Each planet gear 15 is formed centrally with an open-topped recess 51 having a fitting hole (not shown) bored centrally therethrough.

The mounting base 16, as FIG. 1 shows, is generally sector shaped and has a fitting hole 52 formed at the center of circular arc of the sector which is adapted to receive the smaller diameter gear 14, with studs 53 fixed upright on the arcuate side surface of the sector at three locations. The two opposite outer side ones of the three studs 53 are adapted to extend through the fitting holes of the planet gear pair 15 into the recesses 51.

Figure 9A:
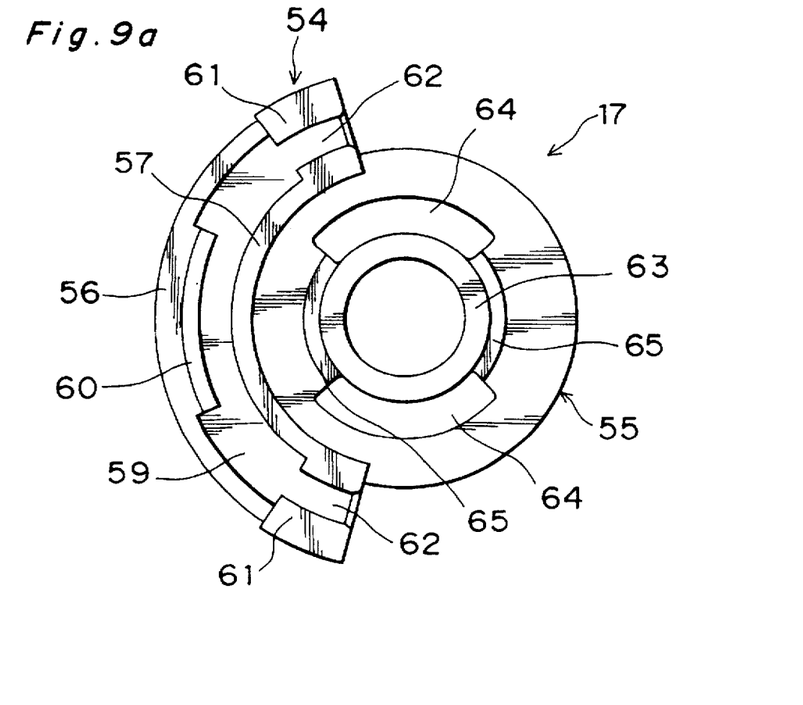
FIGS. 9a and 9b are, respectively, a plan view of the rotary table shown in FIG. 1, and a rear view thereof.
Figure 9B:
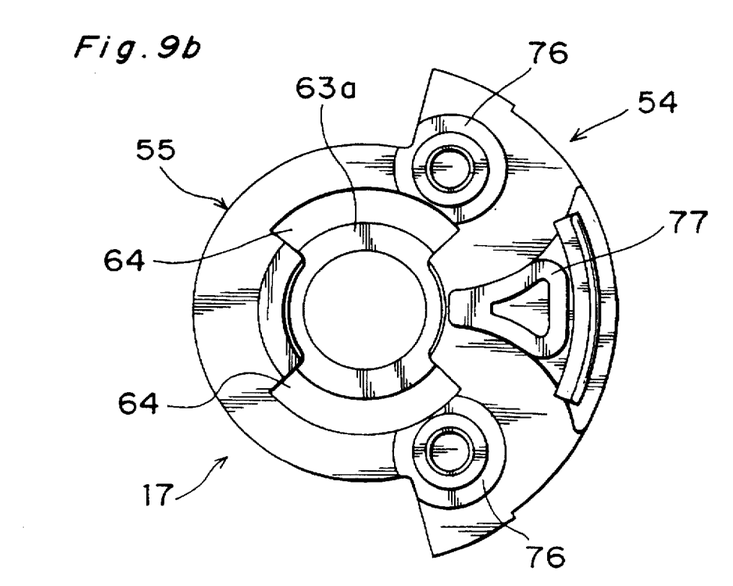
Figure 10A:
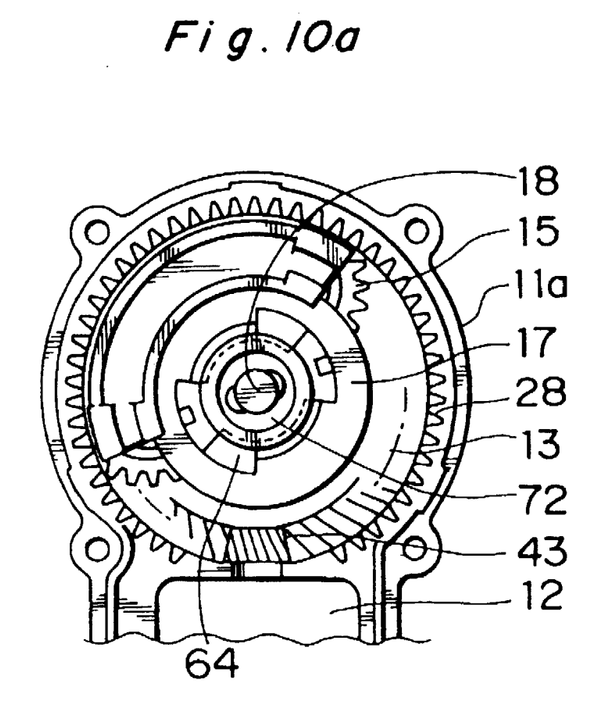
FIG. 10 is a plan view showing the rotary table and action knob in FIG. 1 in their rotating condition.
Figure 10B:
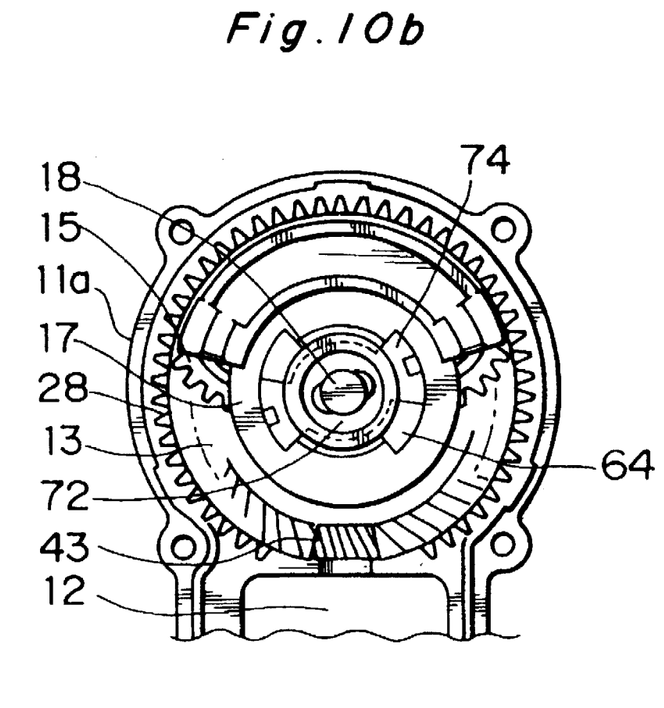

The rotary table 17, as FIGS. 9a, 9b show, is generally disc shaped and consists of a large diameter portion 54 and a small diameter portion 55.

On one side of the rotary table 17, as FIG. 9a shows, a first guide portion 56 is provided upright which extends along the outer edge of the large diameter portion 54, and a second guide portion 57 is provided upright at a predetermined distance inward from the first guide portion 56, whereby between the two guide portions there is formed a spring groove 59 in which a return spring 58 (see FIG. 1) is disposed. On the first guide portion 56 at a median location there is provided a circumferentially extending slip-off preventive portion 60 which is inwardly oriented. The first guide portion 56 and the second guide portion 57 are both formed at their respective both ends with inwardly projecting spring bearings 61. Between these spring bearings 61 there are formed guide grooves 62 for shifting over arcuate guide portions 34a, 34b of the second holder 11b.

In the center of the small diameter portion 55 there is provided an annular bearing portion 63 such that the annular shaft portion 33 of the second holder 11b is positioned on the inner periphery of the bearing portion 63. At symmetrically opposite locations across the annular bearing portion 63 there are provided arcuate holes 64 bored along the outer periphery of the annular bearing portion 63, and at circumferentially opposite locations included between the arcuate holes 64 there are provided arcuate walls 65 standing upright. An insulation plate 66 is to be fitted around the pair of the arcuate walls 65.

The insulation plate 66, as may be seen from FIG. 1, is an annular element formed from synthetic resin and has pairs of protrusions 67, 68 formed on both sides at symmetrical locations, one pair on each side. On one side of the insulation plate 66 a contact plate 69 is to be integrated therewith by protrusions 67, and on the other side an action knob 72 is to be integrated likewise by protrusions 68.

As may be appreciated from FIG. 1, the contact plate 69 is an annular element cut out from a conductive and springy sheet material. The contact plate 69 has through-holes 70 bored therein at symmetrical locations which are engageable with the protrusions 67, and at positions angularly orthogonal to the symmetrical locations it has contacts 71 formed by bulging which are to contact the terminal elements 35a, 35b, 35c. The contact plate 69 is adapted to interconnect terminal elements 35a and 35b, or 35b and 35c according to the angular position to which it is turned. The contact plate 69 is bent so that it can jut out most at contacts 71.

The action knob 72, as FIG. 1 shows, has a generally elliptic shape and has an elliptic hole 73 bored in its center portion, with bulged portions 74 extended longitudinally from both ends of the knob 72. Each bulged portion 74 has a sector configuration which makes a certain angle with the center of the ellipsoid, and is centrally formed with a notch 75 to be lockingly engaged by one protrusion 68 of the insulation plate 66.

On the other side of the rotary table 17, as FIG. 9b shows, in the large diameter portion 54 there are formed tubular elements 76, 77 which are to be engaged by studs 53 formed on the mounting base 16. It is noted in this conjunction that the median tubular element 77 is configured to be generally triangular so as not to be subject to interference by planet gears 15.

In the small diameter portion 55, with the action knob 72 held in abutment against the bottom 63a of the annular bearing portion 63, the bulged portions 74 of the action knob 72 are positioned in the arcuate holes 64 which are formed over a larger angular range than the bulged portions 74. As a result, a so-called play is provided such that the action knob 72 is free to rotate within a predetermined angular range.

Each notch 75 of the action knob 72 is adapted to be lockingly engaged by one protrusion 68 of the insulation plate 66 which projects through one of the arcuate holes 64, whereby the action knob 72 and insulation plate 66 are made integrally rotatable. Shown by 78 is a waterproofing O-ring.

The output shaft 18, as FIG. 1 shows, is a metal rod having a collar 18a formed on a top portion thereof, with its lower end cut off to a generally rectangular shape. The lower end portion of the output shaft 18 extends through the through-hole 50 of the smaller diameter gear 14 before it projects from the bottom of the lower holder 11a, and as it so projects the output shaft 18 is integrally joined with an output lever 79 through the O-ring 78. The upper end collar 18a of the output shaft 18 is to be engaged by the action knob 72 for integral rotation.

Shown by 80 are tightening screws which are used in fitting the upper holder 11b on the lower holder 11a. Shown by 81 is a wire harness comprised of wires 81a to be individually connected to motor 12, positive thermistor 24, terminal element 35b, and terminal element 35a or 35c.

The actuator 10, comprised of the foregoing components, is assembled in the following manner.

Initially, the small diameter portion 49 of the smaller diameter gear 14 is fitted into the engagement hole 46 of the larger diameter gear 13, whereby the gears are brought into integration. The action knob 72 is placed in an arcuate recess 77 of the rotary table 17, and the protrusions 68 of the insulation plate 66 are caused to jut out through the arcuate holes 64 at opposite sides to lockingly engage the notches 75 of the action knob 72 into integration. In this condition, the action knob 72 is rotatable within a certain angular range in the arcuate holes 64, a so-called play being thereby defined. In turn, the insulation plate 66 is integrated with the contact plate 69 through protrusions 67.

The planet gears 15 are mounted on the mounting base 16, with the studs 53 at both ends of the mounting base 16 being fitted through the fitting holes of the planet gears 15. Then, tubular elements 76, 77 of the rotary table 17 are caused to engage with the studs 53 within the recesses 51 of the planet gears 15, whereby the planet gears 15 are rotatably held by both the planet gears 15 and the rotary table 17.

Then, with steel balls 26 positioned in the recesses 27 of the gear compartment 20 of the first holder 11a, the larger diameter gear 13 and smaller diameter gear 14 are housed in the compartment in such a way that the smaller diameter gear 14 projects upward. In this condition, the larger diameter gear 13 is rotatably supported by steel balls 26 at only three points, being thus less subject to friction resistance.

Next, the motor 12, with the motor gear 43 mounted on its rotary shaft 42, is housed together with the positive thermistor 24 in the motor compartment 19 of the first holder 11a. In this case, since the larger diameter gear 13 is supported on steel balls 26 as stated above, which permits rotation in stable condition, the motor gear 43 and the spiral toothed portion 44 of the larger diameter gear 13 are held in steady engagement with each other.

The output shaft 18 is fitted in the through-hole 50 of the smaller diameter gear 14 so that the lower end of the output shaft 18 projects from the underside of the first holder 11a. In this case, the collar 18a of the output shaft 18 abuts the upper surface of the smaller diameter gear 14 to be prevented from further insertion. Then, the lower end of the output shaft 18 is integrated with the output lever 79 through the O-ring 78.

Figure 11A:
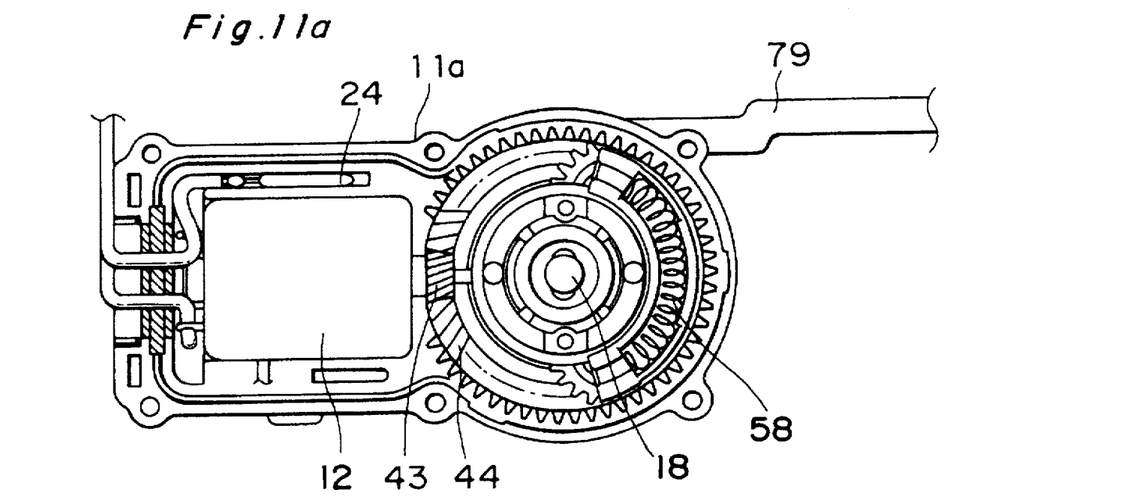
FIGS. 11a, 11b and 11c are, respectively, a plan view, a sectional view, and a rear view, of the actuator shown in FIG. 1 in assembled condition thereof.

Subsequently, the planet gears 15, supported on the mounting base 16 and rotary table 17, are housed in the gear compartment 20 of the first holder 11a. In this case, the planet gears 15 are brought into mesh engagement with the smaller diameter gear 14 and inner teeth 28 of the gear compartment 20. The collar 18a of the output shaft 18 engages the elliptic hole 73 of the action knob 72 through the fitting hole 52 of the mounting base 16. A return spring 58 is placed in the spring groove 59 of the rotary table 17 (see FIG. 11a).

Figure 11B:
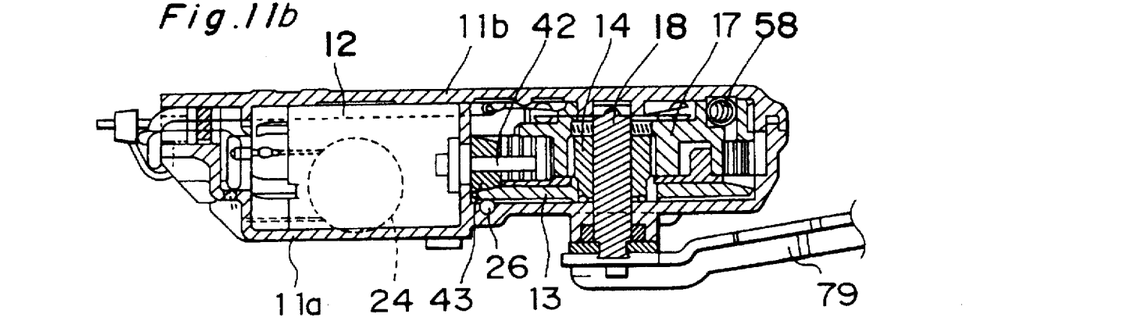
Figure 11C:
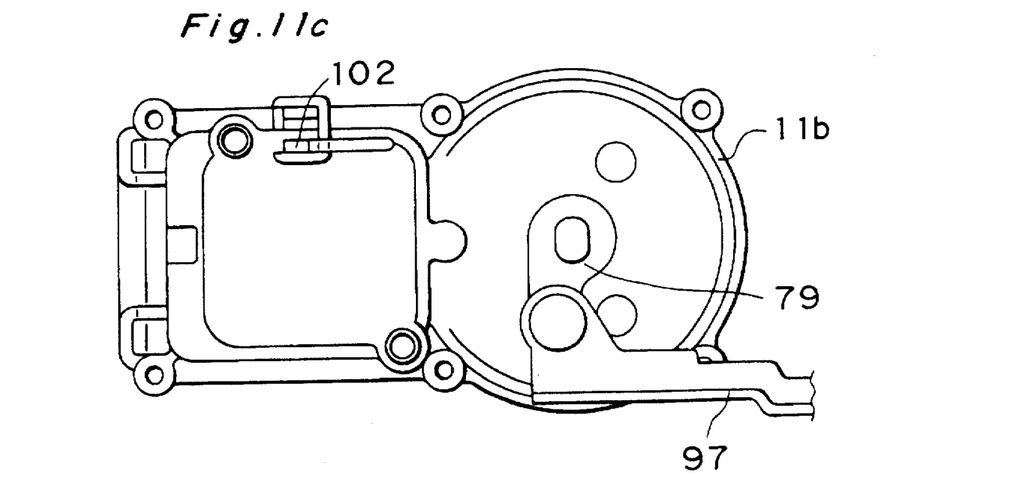

Finally, seal member 37 is mounted in the grooved portion 30 of the second holder 11b to which terminal elements 35a, 35b, 35c have been previously securely affixed and, with the motor hold-down portion 39 positioned in the recess 32, the top open portion of the first holder 11a is covered with the second holder 11b, the two holders being then fixed together by tight screws 80 into integral unity (see FIG. 11b). Thereupon, the motor hold-down portion 39 goes into direct abutment with the motor 12. It is to be noted that the motor hold-down portion 39, which is defined between straight portions 38c, serves to hold the configuration of the seal member 37 as such. This permits the seal member 37 to be readily mounted in the grooved portion 30. For the purpose of the foregoing assembly work, it is necessary that the rotary table 17 be previously positioned at a neutral position, that is, at a median position with respect to the two guide portions 34a, 34b of the second holder 11b. It is also necessary that components of the wire harness 81 including wires 81a connected to the motor 12, positive thermistor 24, and terminal elements 35a, 35b, 35c be bundled together at one end of the first holder 11a.

Since the rotary table 17 has a slip-off preventive portion 60 formed therein, the return spring 58 may be accommodated in the spring groove 59 before the rotary table 17 is put into the assembly process, without any slip-off possibility.

The actuator 10, thus brought to completion, is applicable, for example, to a door lock mechanism 90 as shown in FIG. 12. The door lock mechanism 90 has a construction of the type well known in the art such that it includes a base plate 91 and a plurality of levers 92, 93 attached rotatably thereto, and is mounted in the interior of a door body. In this mounted condition, the actuator 10 is positioned in such a way that the motor compartment 19 side thereof is located on the vertically lower side. In the door lock mechanism 90, each lever 93 and the like are rotatable through the manipulation of an outer or inner handle not shown to permit the door to be opened. Further, the arrangement is such that by manipulating a key (not shown) or an inner lock knob 94, the lever 92, etc. are caused to rotate to bring the door into locked condition or unlocked condition.

A holding element 95 extends from the base plate 91, the holding element 95 including locking holder pawls 96 of L shape in section which are bent at front end toward each other.

The actuator 10, with locking pawl portions 85 as described above, may be mounted to the holding element 95 of the base plate 91 in the following manner. The bottom side of the first holder 11a is caused to slide on the holding element 95 in manner as indicated by the arrow in FIG. 12. As a result, locking pawls 86 of the actuator 10 abut the locking holder pawls 96 to become deformed inward and the locking holder pawls 96 go into engagement with the holding recesses 88, whereupon the locking pawls 86 resiliently return to shape to define a locked condition. Then, the output lever 79 and the lever 92 are interconnected by an operating lever 97 so that the operation of the actuator 10 can be transmitted to the door lock mechanism 90.

Next, operation of the actuator 10, constructed as above described, will be explained.

When the motor 12 is driven to rotate the rotary shaft 42 forward, the larger diameter gear 13 and the smaller diameter gear 14 rotate in same direction and, as a result, the pair of planet gears 15 in mesh engagement with the smaller diameter gear 14 go into rotation. Since the planet gears 15 are in mesh engagement with the inner teeth 28 of the first holder 11a as well as with the smaller diameter gear 14, there occur changes in their position of mesh engagement with the inner teeth 28.

As the planet gears 15 shift their position, the rotary table 17 rotates together with the mounting base 16 against the biasing force of the return spring 58. During such rotation, the return spring 58 is free from the possibility of it tending to outwardly deform to go out of position, because the slip-off preventive portion 60 is present which extends inwardly from the first guide portion 56 located at an outermost site in the rotary table 17. As earlier stated, a certain play is defined between the arcuate holes 64 of the rotary table 17 and the action knob 72. Therefore, the rotation of the action knob 72 begins only after the rotary table 17 is actuated by the motor 12 to rotate over a certain angular distance. Further, the rotary table 17, with its circumferential end portions adapted to abut the cushioning portions 40 provided integrally with the seal member 37, is restricted in its angular range of rotation and is less subject to any impact upon impingement because such impact is absorbed by the cushioning portions 40. This provides for smooth operation.

As the action knob 72 rotates, the output shaft 18 integral therewith rotates and, in turn, the lever 92 of the automotive door lock mechanism 90 rotates to release the door lock condition.

After the door lock condition is released, operation of the motor 12 may be stopped, whereupon the rotary table 17 returns automatically to the neutral position under the biasing force of the return spring 58.

When the motor 12 is driven to rotate the rotary shaft 42 reverse, the door lock mechanism is actuated through the larger diameter gear 13, smaller diameter gear 14, planet gears 15, rotary table 17, action knob 72, output shaft 18, output lever 79, and operating lever 97 in the same manner as above described, whereby a door lock condition is obtained.

In this way, with the actuator 10, the motor 12 is driven to actuate the door lock mechanism, and the motor 12 may generate vibrations and noise. In the present embodiment, however, the motor hold-down portion 39 integrated with the seal member 37 abuts directly against the motor 12 and absorbs such vibrations and noise. Thus, there is no likelihood that vibrations and noise from the motor 12 will be transmitted to the outside.

The actuator 10 is adjustable for use with either a right-side door lock mechanism or a left-side door lock mechanism. For the right-side use, the wire harness 81 is connected to terminal elements 35a and 35b, and not to 35c. For the left-side use, the wire harness 81 is connected to terminal elements 35b and 35c, and not to 35a.

When the door lock mechanism 90 is in door lock condition, the contact 71 of the contact plate 69 contacts that one of terminal elements 35a and 35c which is not connected to the wire harness 81, and no current-carrying circuit is formed between 35b and 35a or 35c. When the door lock mechanism 90 is in unlock condition, the contact 71 of the contact plate 69 contacts that one of terminal elements 35a and 35c which is connected to the wire harness 81, and a current-carrying circuit is formed between 35b and 35a or 35c. Therefore, it is possible to judge whether the door lock mechanism 90 is in door lock condition or in door unlock condition.

A circuit for controlling the motor 12 may be provided to arrange that when the mechanism 90 is in door lock condition, the motor 12 is driven to actuate the rotary shaft 42 to rotate forward to thereby produce door unlock condition, whereas when the mechanism 90 is in door unlock condition, the motor 12 is driven to actuate the rotary shaft 42 to rotate reverse to thereby produce door lock condition.

The motor gear 43 and smaller diameter gear 14, which are both of metal material, are not in direct mesh engagement. Since metallic gear elements are nowhere in mesh engagement, there is no possibility of metallic noise generation.

The output shaft 18 serves as a support shaft for the smaller diameter gear 14, which decreases the number of parts required. Since the output shaft 18 projects from the bottom of the lower-side holder 11a after passing through the center of rotation of the larger diameter gear 13, the output lever 79 integrated with the output shaft 18 is prevented from being positioned off the bottom of the lower-side holder 11a. This permits efficient space provision.

When the inner lock knob 94 or the like is rotated through manual control, the door can be brought into locked condition or unlocked condition in the same manner as above described. In this case, because of the presence of aforesaid play, in the actuator 10, the output shaft 18 and action knob 72 only rotate through the operating lever 97 and output lever 79, no superfluous force being required for the control of the inner lock knob 94 and the like.

In the actuator 10, the interior air may be subject to expansion due to heat generation or the like at the motor 12. However, since the interior of the actuator 10 is in communication with the exterior through the air vent hole 100, there is no possibility of leaks or the like occurring with respect to the holders 11a, 11b or the like as a result of an increase in the internal pressure. The air vent hole 100 is of a complex configuration such that it consists of interior side recess 101 and exterior side recess 102. In addition, the actuator 10 is disposed in such a way that the motor compartment 19 is positioned on the vertically lower side, the interior side recess 101 being positioned above the exterior side recess 102. Therefore, if droplets of rainwater or the like tend to enter the interior of the actuator 10 through the air vent hole 100, only few droplets could reach the interior side recess 101. The vertically lower side portion of the interior side recess 101 is covered with the water exposure preventive portion 39b, so that any water droplets which may have entered the interior side recess 101 can be positively prevented from further penetration into the interior and finally discharged through the exterior side recess 102. Furthermore, since the bottom of the interior side recess 101 defines an incline, no water droplet, if any could have entered the interior, could stay within the interior side recess 101.

The above described actuator 10 may be applicable to lever mechanisms for heater control apparatus which are designed for shifting over a certain angular distance or at a certain rate.

Although the present invention has been fully described by way of the examples with reference to the accompanying drawing, it is to be noted here that various changes and modifications will be apparent to those skilled in the art. Therefore, unless such changes and modifications otherwise depart from the spirit and scope of the present invention, they should be construed as being included therein.

What is claimed is:

1. An actuator comprising:
   a housing member including a motor compartment and a gear compartment, the gear compartment having inner teeth formed on the inner periphery thereof;
   a motor having a rotary shaft with a motor gear mounted thereon, the motor being housed in the motor compartment in such a way as to permit the motor gear to project into the gear compartment;
   an output shaft projecting outwardly from the housing member;
   a larger diameter gear housed in the gear compartment which is rotatable about the output shaft and held in mesh engagement with the motor gear;
   a smaller diameter gear disposed coaxially with the larger diameter gear and rotatable in conjunction with the rotation of the larger diameter gear;
   at least one planet gear held in mesh engagement with both the smaller diameter gear and the inner teeth formed in the gear compartment so that each such planet gear can shift its engagement position with respect to the inner teeth as the smaller diameter gear rotates; and
   a rotary member engaging the planet gear(s) for rotation within the gear compartment, the output shaft being rotatable in response to the rotation of the rotary member.

2. An actuator as set forth in claim 1, wherein the motor gear and the larger diameter gear are in the form of bevel gears, and the larger diameter and smaller diameter gears are arranged to be rotatable about the output shaft, the output shaft being disposed in orthogonal relation to the rotary shaft of the motor.

3. An actuator as set forth in claim 1, wherein the rotary member has a spring groove formed in arcuate shape therein and is responsive to the rotation of the gears, and the actuator further includes:
   a coil spring housed in the spring groove, and guide portions disposed across the coil spring for biasing the rotary member toward a neutral position.

4. An actuator as set forth in claim 3, wherein the spring groove of the rotary member is defined by spring guide portions erected at predetermined intervals, and wherein the spring guide portion located at the outer side is provided with an inwardly extending slip-off preventive portion for preventing the slipping off of the coil spring.

5. An actuator as set forth in claim 1, wherein a predetermined play is provided between the rotary member and the output shaft.

6. An actuator as set forth in claim 5, wherein there is provided an action knob which is rotatable with a certain angle of play relative to the rotation of the rotary member, the output shaft being rotatable integrally with the action knob.

7. An actuator as set forth in claim 1, wherein the gear compartment is formed at its bottom with a plurality of recesses, with balls placed in the recesses for rotatably supporting the larger diameter gear.

8. An actuator as set forth in claim 1, wherein the larger diameter gear has in its center portion an engagement hole formed with engaging inner teeth and wherein the smaller diameter gear is non-rotatably engagable with the engagement hole of the larger diameter gear.

9. An actuator as set forth in claim 8, wherein the smaller diameter gear has a portion at one end thereof which is smaller in outer diameter and which smaller portion is the portion of the smaller diameter gear that is non-rotatably engageable with the engagement hole of the larger diameter gear.

10. An actuator as set forth in claim 1, wherein the housing member is in the form of a combination of two components and includes:
    a seal member for sealing a junction of the housing member, the seal member having a motor keep element provided integrally therewith for absorbing vibrations and noise from the motor through direct contact with the motor.

11. An actuator as set forth in claim 10, wherein the driving force of the motor is arranged to be transmitted from a plurality of gears to the output shaft through the rotary member, and wherein the seal member is provided with an inwardly extending cushioning portion for regulating the rotational angle range of the rotary member through contact therewith.

12. An actuator as set forth in claim 10, wherein the housing member has an air vent hole bored therein which is open in a horizontal direction, and wherein the seal member has a water exposure preventive portion formed therein which covers a vertically lower portion of the air vent hole.

13. An actuator as set forth in claim 12, wherein the air vent hole comprises an inner side recess oriented horizontally from the interior of the housing member, and an outer side recess oriented horizontally from the outer side of the housing member, the interior portions defining the respective recesses being in direct communication with each other.

* * * * *